(12) United States Patent
Nakano et al.

(10) Patent No.: US 7,107,427 B2
(45) Date of Patent: Sep. 12, 2006

(54) STORAGE SYSTEM COMPRISING MEMORY ALLOCATION BASED ON AREA SIZE, USING PERIOD AND USAGE HISTORY

(75) Inventors: Yukio Nakano, Oyama (JP); Yuki Sugimoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 186 days.

(21) Appl. No.: 10/811,856

(22) Filed: Mar. 30, 2004

(65) Prior Publication Data
US 2005/0177546 A1 Aug. 11, 2005

(30) Foreign Application Priority Data
Jan. 30, 2004 (JP) ............... 2004-022873

(51) Int. Cl.
*G06F 12/00* (2006.01)
(52) U.S. Cl. .............. 711/170; 711/170; 711/171; 711/172; 711/173; 707/1
(58) Field of Classification Search ................. 711/170
See application file for complete search history.

(56) References Cited

U.S. PATENT DOCUMENTS

| | | | | |
|---|---|---|---|---|
| 5,185,887 | A | 2/1993 | Takahashi et al. ........ 395/600 |
| 5,367,637 | A * | 11/1994 | Wei .................. 710/56 |
| 5,463,381 | A | 10/1995 | Ryu et al. ............ 340/825.08 |
| 5,604,900 | A * | 2/1997 | Iwamoto et al. ......... 707/205 |
| 5,920,869 | A | 7/1999 | Wakayama et al. ....... 707/103 |
| 6,076,151 | A * | 6/2000 | Meier .................. 711/171 |
| 6,256,645 | B1 | 7/2001 | Mundy .................. 707/205 |
| 6,519,615 | B1 * | 2/2003 | Wollrath et al. ........ 707/206 |
| 6,523,102 | B1 * | 2/2003 | Dye et al. ............. 711/170 |
| 6,799,208 | B1 * | 9/2004 | Sankaranarayan et al. .. 709/223 |
| 6,851,030 | B1 * | 2/2005 | Tremaine .............. 711/160 |

(Continued)

FOREIGN PATENT DOCUMENTS
JP 2002-132549 5/2002

OTHER PUBLICATIONS

Jian Huang and Lilja, D.J., "Eploiting basic block value locality with block reuse", Jan. 9, 1999, High-Performance Computer Architecture, 1999. Proceedings. www.ieeexplore.org.*

*Primary Examiner*—Donald Sparks
*Assistant Examiner*—Yaima Campos
(74) *Attorney, Agent, or Firm*—Mattingly, Stanger, Malur & Brundidge, P.C.

(57) ABSTRACT

In a storage management system for managing a storage device for storing data, management information for managing the storage device, area assignment information for managing an area assignment state of the storage device, and history information for managing a history on area assuring and release are held. Further, an assignment request for temporarily using an area is received in association with designation of an area size and a using period. It is determined whether or not the requested area can be assigned by referring to information calculated from the held history information. An area with a designated size at a designated period is assigned to a request source if the area can be assigned as a result of the determination. In the determination, transition of a used amount of a storage is obtained from the history information, and it is determined based on the transition of the used amount of the storage whether or not the designated area can be assigned at the designated period.

15 Claims, 19 Drawing Sheets

U.S. PATENT DOCUMENTS

| | | | |
|---|---|---|---|
| 2002/0087539 A1 | 7/2002 | Muraoka | 707/102 |
| 2003/0065902 A1 | 4/2003 | Shiga et al. | 711/170 |
| 2004/0068501 A1* | 4/2004 | McGoveran | 707/8 |
| 2004/0193803 A1* | 9/2004 | Mogi et al. | 711/129 |
| 2005/0021562 A1 | 1/2005 | Idei et al. | 707/104.1 |

* cited by examiner

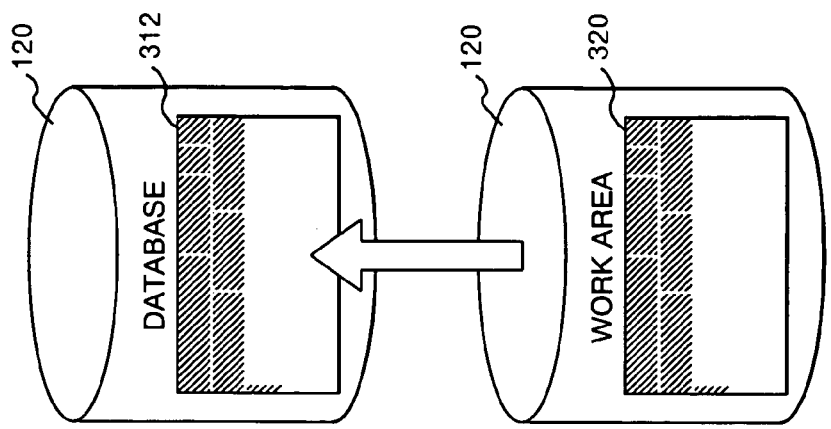
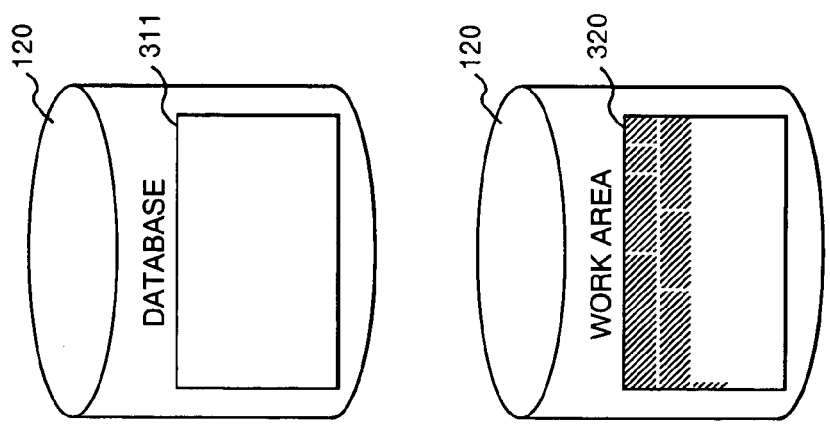
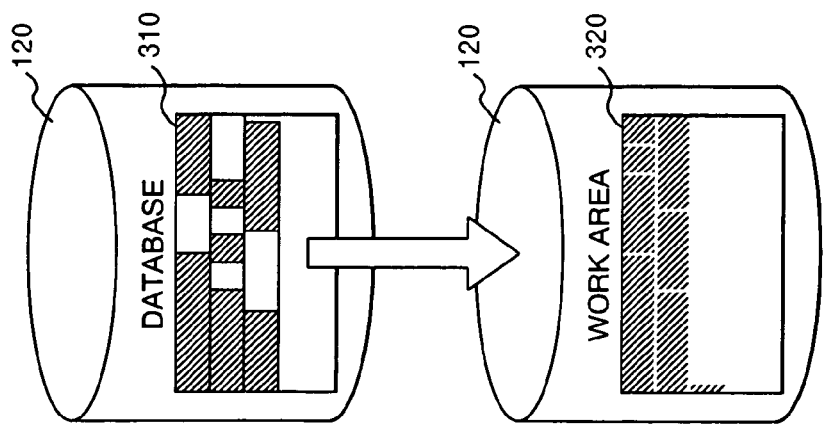

FIG. 4

CONSTANTLY-ASSIGNED AREA LIST 107

| USER NAME | STORAGE DEVICE | AREA NAME | ASSIGNMENT SIZE | ASSIGNMENT TIME AND DATE |
|---|---|---|---|---|
| nakano | RAID1 | pool 1 | 9GB | 2003/8/8 19:40:00 |
| nakano | DISK2 | lvol 1 | 4GB | 2003/8/9 10:10:00 |
| | | | | |

FIG. 5

TEMPORARILY-ASSIGNED AREA LIST 108

| USER NAME | STORAGE DEVICE | AREA NAME | ASSIGNMENT SIZE | ASSIGNMENT TIME AND DATE | USING PERIOD |
|---|---|---|---|---|---|
| nakano | RAID1 | pool 2 | 3GB | 2003/8/7 7:40:00 | 4H |
| nakano | DISK1 | lvol 1 | 2GB | 2003/8/8 10:10:00 | 2:30H |
| | | | | | |

FIG. 16

AREA MANAGEMENT HISTORY 109

| ASSURE OR RELEASE AREA | AREA NAME | DATE |
|---|---|---|
| ASSURE | pool 2 | 2003/8/7 7:40:00 |
| RELEASE | pool 2 | 2003/8/7 11:25:00 |
| ASSURE | lvol 1 | 2003/8/8 10:10:00 |
| RELEASE | lvol 1 | 2003/8/8 12:40:00 |
| ASSURE | pool 1 | 2003/8/8 19:40:00 |
| | | |

FIG. 17

AREA RESERVATION LIST 1105

| USER NAME | RESERVATION DATE | SIZE OF RESERVED AREA | USING PERIOD | STORAGE DEVICE | AREA NAME |
|---|---|---|---|---|---|
| nakano | 2003/9/7 10:00 | 3GB | 8H | RAID1 | pool 1 |
| yamada | 2003/8/12 20:00 | 4GB | 6Hr | RAID1 | pool 2 |
| | | | | | |

FIG. 19

ACCOUNT TABLE 1802

| USER NAME | STORAGE DEVICE | ASSIGNMENT SIZE | USING PERIOD | ACCOUNT RANK |
|---|---|---|---|---|
| nakano | RAID1 | 3GB | 4H | 1 |
| nakano | DISK1 | 2GB | 2:30H | 1 |
|  |  |  |  |  |

Columns: 1901, 1902, 1903, 1904, 1905

FIG. 20

CHARGE TABLE 1803

| STORAGE DEVICE | CONSTANT ASSIGNMENT | | TEMPORARY ASSIGNMENT | | |
|---|---|---|---|---|---|
|  | MONTHLY CHARGE | DAILY CHARGE | MONTHLY CHARGE | DAILY CHARGE | EXCESS |
| RAID1 | 1000 | 30 | 800 | 25 | 50 |
| DISK1 | 500 | 15 | 400 | 12.5 | 25 |
|  |  |  |  |  |  |

Columns: 2001, 2002, 2003

STORAGE SYSTEM COMPRISING MEMORY ALLOCATION BASED ON AREA SIZE, USING PERIOD AND USAGE HISTORY

BACKGROUND OF THE INVENTION

Field of the Invention

The present invention relates to a storage system and, more particularly, to a database management system (DBMS) and an area automatic assigning method of a storage management system.

In accordance with the widespread of SAN (Storage Area Network), a plurality of large-capacity storages including disk are connected by the SAN and the disk is managed on storage management software. On the storage management software, the storage connected to the SAN is virtualized and is managed as a storage pool. When area assignment is requested, the storage is cut out from the storage pool and an area is assigned to the cut-out storage.

The storage required by application comprises a constantly necessary area (constant area) and an area which is temporarily necessary for the use in operation work. Currently, upon the system design, the capacity of the constant area and the temporary area is obtained and the area is previously secured. For example, in reediting processing which is periodically executed in a database management system (DBMS), in order to extract and re-store the entire data as the reediting target, a work area equal to the data capacity is necessary for storing the extracted data. Therefore, a work area for reediting which is temporarily used is previously secured, apart from the area for database which is constantly used.

A user needs to prepare this work area. However, under an environment under which a plurality of applications is executed, the required temporary area is large and the storage costs increase.

For example, Japanese Unexamined Patent Publication No. 2002-132549 discloses a technology for reducing the storage costs of the temporary area by using a disk area comprising a constant area that is constantly assigned and a temporary area which is temporarily assigned and by sharing the disk area that is assigned to the temporary area among the applications.

Further, according to the technology disclosed in Japanese Unexamined Patent Publication No. 2002-132549, a part of the area is previously secured for the temporary area. However, when the use over the capacity of the secured area is simultaneously requested by a plurality of users, there is a problem that even though a non-assigned area exits in the constant area, the area is not assigned as long as the entire temporary areas are used.

SUMMARY OF THE INVENTION

Accordingly, it is one object of the present invention to reduce the storage costs by effectively assigning an unused area for the use of the temporary area.

Further, it is another object of the present invention to provide an area assigning method of the storage, by which a free area in the storage is assigned with the necessary area size as the temporary area during a necessary period in accordance with an area assigning request.

According to the present invention, an area assigning method in a storage management system for managing a storage device for storing data, comprises the steps of: holding management information for managing the storage device, area assignment information for managing an area assigning state of the storage device, and history information for managing a history of area assuring and release; receiving an assignment request for temporarily using an area in association with designation of an area size and a using period; determining whether or not a requested area can be assigned by referring to information calculated from the held history information; and assigning an area with a designated size at a designated period to a request source if the area can be assigned as a result of the determination.

Preferably, in the determining step, transition of a used amount of a storage is obtained based on the history information, and it is determined whether or not a designated area can be assigned at the designated period based on the transition of the used amount of the storage.

Further, preferably, a necessary area size and a necessary using period are obtained upon executing the processing for temporarily using the storage. The assignment of the area which is temporarily used for storage management is requested. Then, the processing is executed by using the area assigned for the storage management and the release of the area which is not necessary after completing the processing is requested.

Furthermore, preferably, the present invention is applied to the execution of database reediting processing. That is, an execution time of reediting processing and a size of a work area necessary for reediting are obtained when a database management system executes the reediting processing. The assignment of the area which is temporarily used for storage management is requested. The reediting is executed with the area assigned for the storage management as a work area. The release of the area which is not necessary is requested when the reediting completes.

Moreover, preferably, a storage management system monitors the using period of the assigned area after assigning the temporarily-used area and calculates the excess of an area use charge when it is over the using period as a result of the monitoring.

In addition, the present invention is realized as a program having function for executing the foregoing.

BRIEF DESCRIPTION OF THE DRAWINGS

FIGS. 3A to 3C are diagrams for explaining DBMS reediting processing according to the embodiment;

FIG. 4 is a diagram showing one example of the table structure of a constantly-assigned area list 107;

FIG. 5 is a diagram showing one example of the table structure of a temporarily-assigned area list 108;

FIG. 16 is a diagram showing one example of the table structure of an area management history 109;

FIG. 17 is a diagram showing one example of the table structure of an area reservation list 1105;

FIG. 19 is a diagram showing one example of the table structure of an account table 1802 according to another embodiment;

FIG. 20 is a diagram showing one example of the table structure of a charge table 1803 according to another embodiment;

DETAILED DESCRIPTION OF THE PREFERRED EMBODIMENTS

Hereinbelow, embodiments of the present invention will be described in detail with reference to the drawings.

Figure 1:
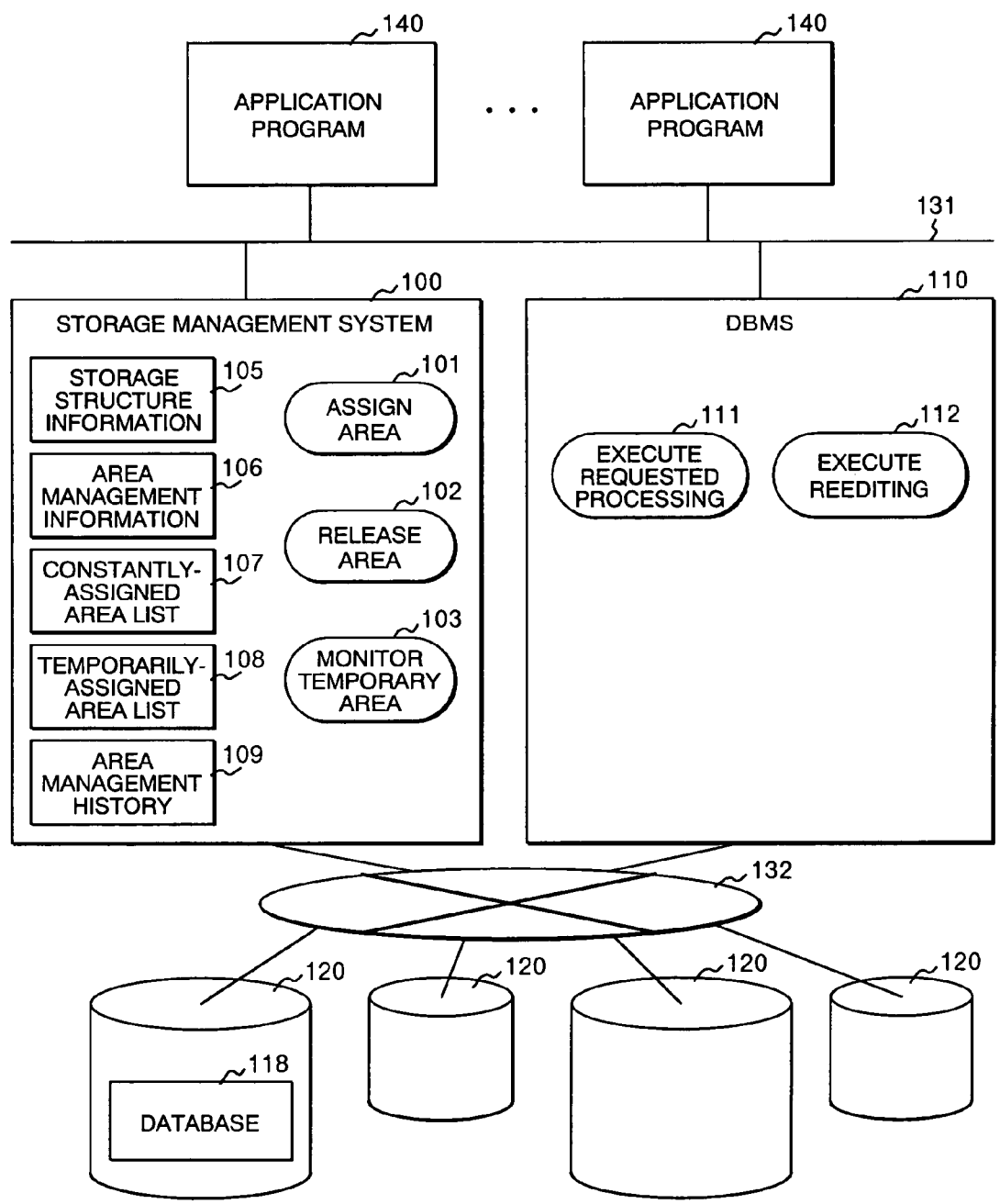
FIG. 1 is a block diagram showing the entire structure of a storage system according to the first embodiment of the present invention.

FIG. 1 is a block diagram showing the entire structure of a storage system according to one embodiment of the present invention. A plurality of storage devices 120 are connected to a storage management system 100 via an SAN (Storage Area Network) 132. The storage devices 120 are managed by various management information 105 to 109 which is held by the storage management system 100. The storage management system 100 and a DBMS (database management system) 110 are connected to application 140 of a client via a network 131, and execute a processing request from the application 140.

As the management information on the storage devices 120, the storage management system 100 holds, in a main memory 203, storage structure information 105, area management information 106, a constantly-assigned area list 107, a temporarily-assigned area list 108, and an area management history 109 in the table format. The storage structure information 105 manages the storage devices 120 connected to the SAN 132. The area management information 106 manages the area assignment state of the storage devices 120.

The constantly-assigned area list 107 is information on the assigned area for constant use. Referring to FIG. 4, as one example of the table structure, the constantly-assigned area list 107 registers information indicating an area user name 401, an assigned storage device 402, an assigned area name 403, an assigned area size 404, and an assignment date 405.

The temporarily-assigned area list 108 is information on the assigned area for temporary use. Referring to FIG. 5, the table structure is shown and the temporarily-assigned area list 108 registers information indicating an area user name 501, an assigned storage device 502, an assigned area name 503, an assigned area size 504, an assignment date 505, and a using period 506. The using period 506 is determined in consideration of the time required for database reediting processing, as will be described later. The area management history 109 stores history information upon executing the area assuring and release processing.

FIG. 16 shows the table structure of the area management history 109. The are management history 109 stores information on display 161 indicating the securing or release of the area, an area name 162 which is secured or released, and time 163 at which the securing and release are executed.

In the storage management system 100, the main memory 203 further comprises programs which execute "assign area" 101, "release area" 102, and "monitor temporary area" 103. The "assign area" 101 and the "release area" 102 are executed in accordance with an area assigning request or a releasing request which is transmitted to the storage management system 100 from the DBMS 110 via the network 131. The "monitor temporary area" 103 checks whether or not the temporarily-assigned area is used over the designated period.

The DBMS 110 stores a database 118 in an area of the storage devices 120 connected by the SAN 132, which is assigned by the storage management system 100. The DBMS 110 has programs for "execute processing request" 111 and "execute reediting" 112. The processing request is received from the application program 140, then the DBMS 110 executes the requested processing (111), and further executes the processing which is requested to the data base 118. The data is repeatedly inserted and deleted in response to the processing request and therefore the storing efficiency of the database 118 deteriorates and, then, the DBMS 110 executes the reediting (112).

Figure 2:
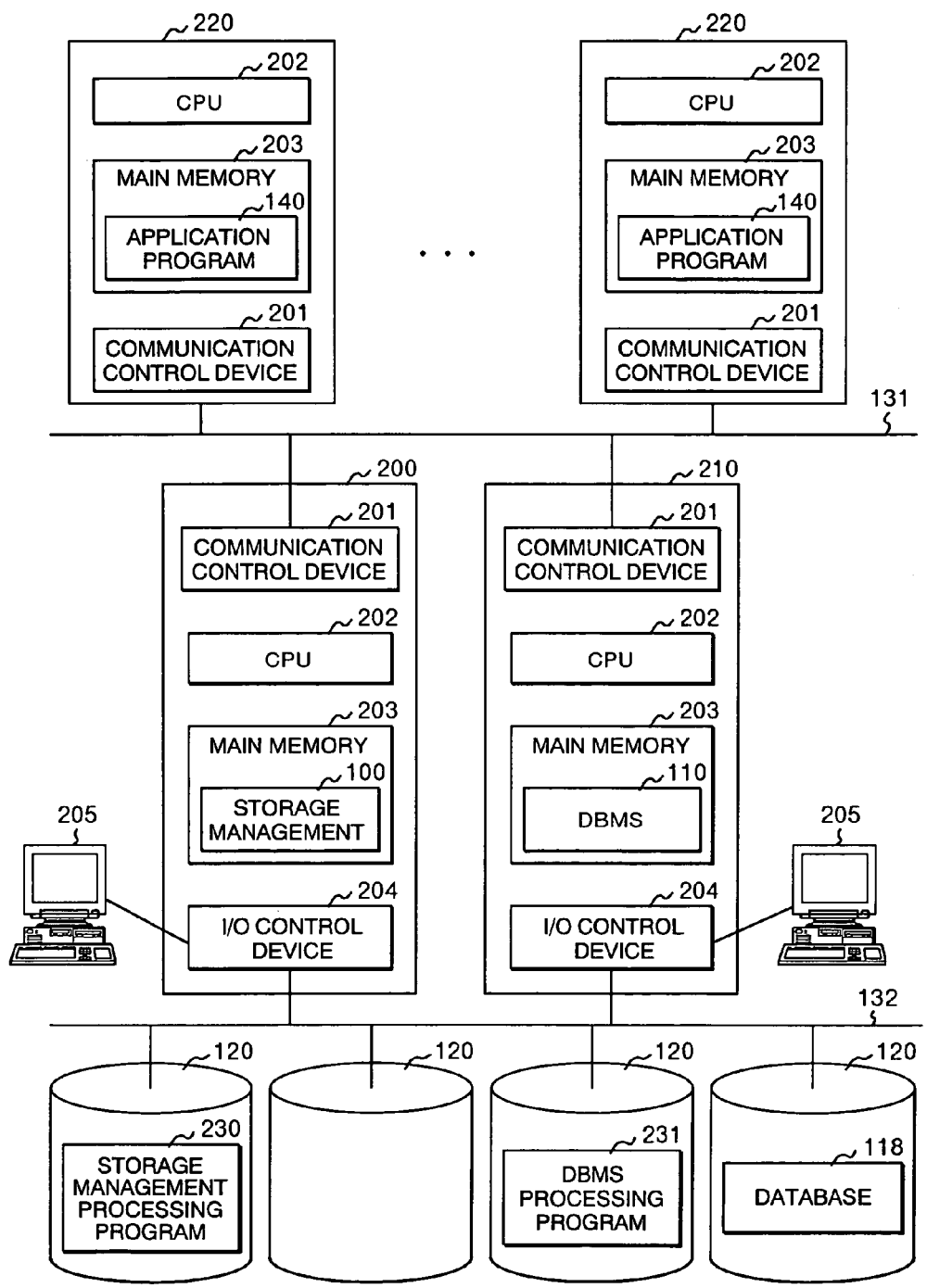
FIG. 2 is a diagram showing the hardware structure of the storage system according to one embodiment.

FIG. 2 is a diagram showing the hardware structure of the storage system according to this embodiment.

An information processing device 200 comprises: a communication control device 201; a CPU 202; the main memory 203; and an I/O control device 204. The information processing device 200 functions as a device for the storage management system 100, and fetches a storage management processing program 230 stored in the storage devices 120 into the main memory 203. The CPU 202 executes the storage management processing program 230, thereby performing the processing of the storage management system 100. The I/O control device 204 manages the storage devices 120 connected to the SAN 132 and writes/reads the data stored in the storage devices 120. The communication control device 201 receives/transmits information to another information processing device connected by the network 131. A console terminal 205 is connected to the I/O control device 204.

The information processing device 210 comprises: the communication control device 201; the CPU 202; the main memory 203; and the I/O control device 204. The information processing device 210 functions as a device for the DBMS 110, and fetches a DBMS processing program 231 stored in the storage devices 120 into the main memory 203. The CPU 202 executes the DBMS processing program 231, thereby performing the processing of the DBMS 110. The I/O control device 204 writes/reads via the SAN 132 the database 118 stored in the storage devices 120. The communication control device 201 receives/transmits information to another information processing device connected by the network 131. The reediting processing of the database 118 is executed by operating a console terminal 205' connected to the I/O control device 204 in the information processing device 210.

A plurality of information processing devices 220 function as clients, and the hardware thereof is similar to that of the other information processing devices. That is, the application program 140 is stored in the main memory 203 and is executed by the CPU 202. The application program 140 executes the inquiry to the DBMS 110, then, the communication control device 201 in the information processing device 220 transmits a request to the communication control device 201 in the information processing device 210, and the inquiry is transmitted to the DBMS 110. The DBMS 110 executes the processing in accordance with the request. When the access to the database 118 is necessary, the I/O control device 204 accesses the database 118 stored in the storage devices 120. The processing result is transferred to the communication control device 201 in the information processing device 220 from the communication control device 201 in the information processing device 210, and is returned to the application program 140 as the requesting source.

Next, a description is given of the editing processing of the DBMS with reference to FIGS. 3A to 3C.

Referring to FIG. 3A, before the reediting processing, a file in the database (DB) 310 is stored with free spaces.

In the reediting processing, as shown in FIG. 3A, the entire data stored in the DB 310 which is used is extracted, is aligned, and is stored in a work area 320. Referring to FIG. 3B, the contents in a database storage area 311 are cleared. Finally, referring to FIG. 3C, the data temporarily stored in the work area 320 is stored in the original DB area again. Consequently, the data 312 in the DB is aligned and stored.

Next, a description is given of the temporary-area assignment processing of the storage management and the database area reediting processing of the DBMS using the temporary-area assignment processing of the storage management with reference to FIG. 1 and FIGS. 6 to 8.

Figure 6:
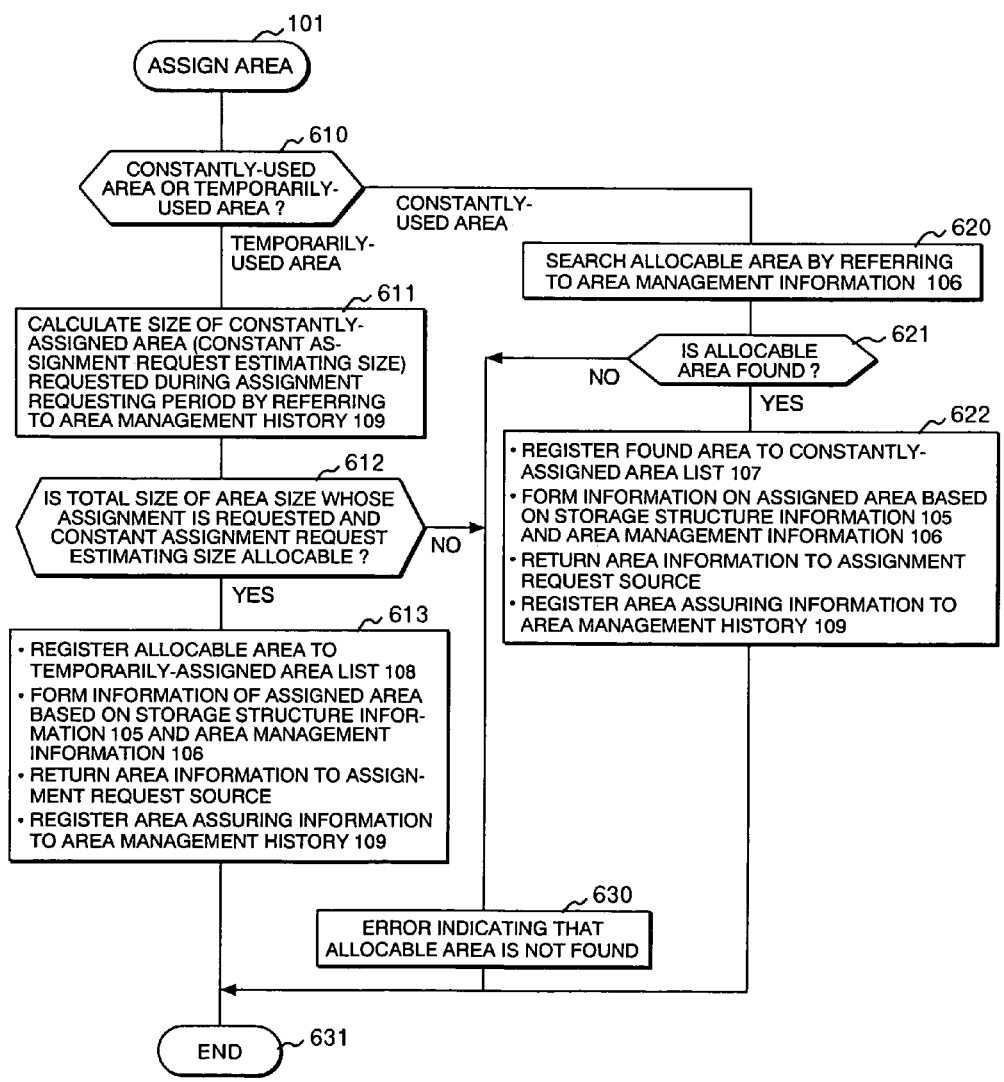
FIG. 6 is a flowchart showing the operation of area assignment processing.

Referring to FIG. 6, the processing of the assigned request will be described. First, the storage management system 100 receives a request for assigning the area and a request for releasing the assigned area from a program using the storage device 120 of the DBMS 110. Here, the request for assigning the area includes a request for assigning the area which is constantly used and a request for assigning the area which is temporarily used. A request command designates any of both the requests.

In the "assign area" 101 in the storage management system 100, it is determined whether the assignment request is for the constantly-used area or for the temporarily-used area (in step 610). If it is determined that the assignment request is for the constantly-used area, the necessary area size is designated and is requested. First, the allocable area is searched by referring to the area management information 106 (in step 620). As the search result, it is checked whether or not the allocable area is found (in step 621). If the allocable area is found, the found area is registered to the constantly-assigned area list 107 (refer to FIG. 4), information on the assigned area is formed based on the storage structure information 103 and the area management information 104, and the area information is returned to the assignment request source, and area assuring information is registered to the area management history 109 (in step 622). On the other hand, if the allocable area is not found as the search result, an error indicating the allocable area is not found is returned (in step 630).

As the result of determining the assignment request (in step 610), if it is determined that the assigning request is for the temporarily-used area, the necessary area size and the using period are designated. First, the constantly-assigned area size requested during the assignment request period (constantly-assignment request estimated size) is calculated by referring to the area management history 109 (in step 611). That is, the area securing size during the corresponding period is estimated based on the transition of the past area securing amount. Next, it is checked whether or not the total size of the area size requested for assignment and the area securing size during the corresponding period can be assigned (in step 612). If it is determined that the total size can be assigned, the allocable area is searched and the found area is registered to the temporarily-assigned area list 108 (refer to FIG. 5), and the information on the assigned area is formed based on the storage structure information 103 and the area management information 104, the formed information is returned to the assignment request source, and the area information is registered to the area management history 109 (in step 613). If it is determined that the total size cannot be assigned, the error indicating that the temporarily-assigned area is not found is returned (in step 630).

Figure 7:
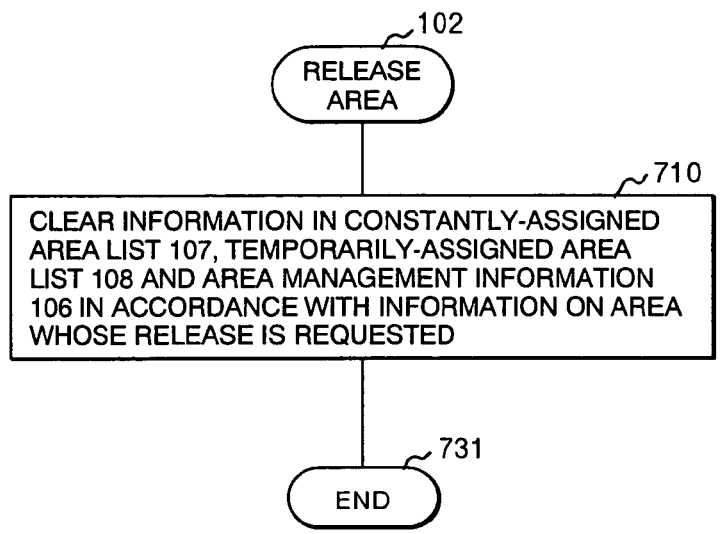
FIG. 7 is a flowchart showing the operation of area release processing.

Next, the processing for request for releasing the area will be described with reference to FIG. 7.

The DBMS 110 issues the request for releasing the area to the storage management system 100 at any time when the area is not necessary.

The storage management system 100 receives the request for releasing the area and then executes the "release area" 102. Further, the storage management system 100 clears the information in the constantly-assigned area list 107, and the temporarily-assigned area list 108, and the area management information 105 in accordance with the information on the area whose release is requested, and registers the information on the area release to the area management history 109 (in step 710).

Figure 8:
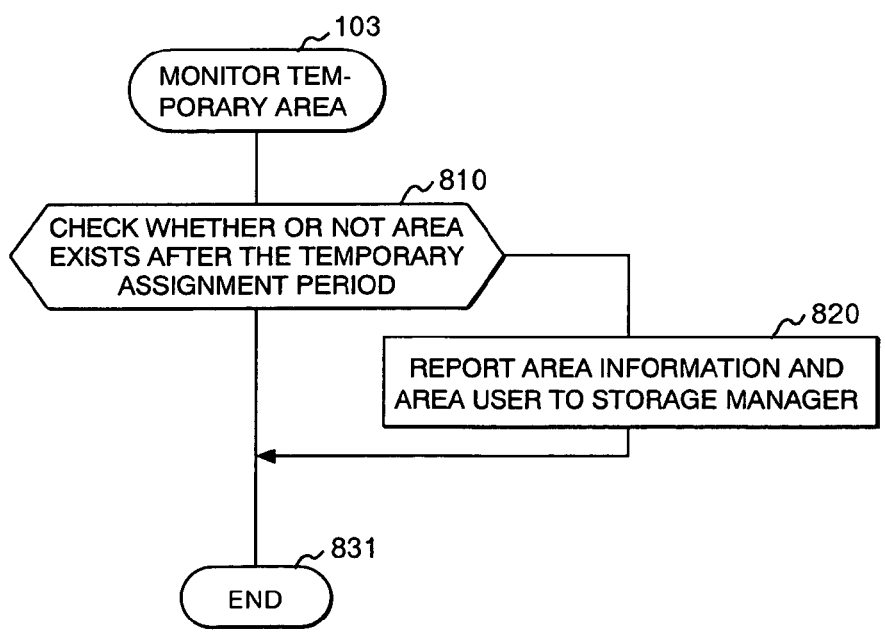
FIG. 8 is a flowchart showing the operation of temporary area monitoring processing.

Next, a description is given of the temporary-area monitoring processing with reference to FIG. 8.

In the "monitor temporary area" 103, it is checked by referring to the temporarily-assigned area list 106, whether or not the area exists after the temporarily-assigned period (in step 810). If the area exists after the temporarily-assigned period, the area information and information on the user of the area are read and are transferred and displayed onto the console terminal 205 by referring to the temporarily-assigned area list 108. Consequently, the contents of period passage are reported to a storage manager (in step 820).

Figure 9:
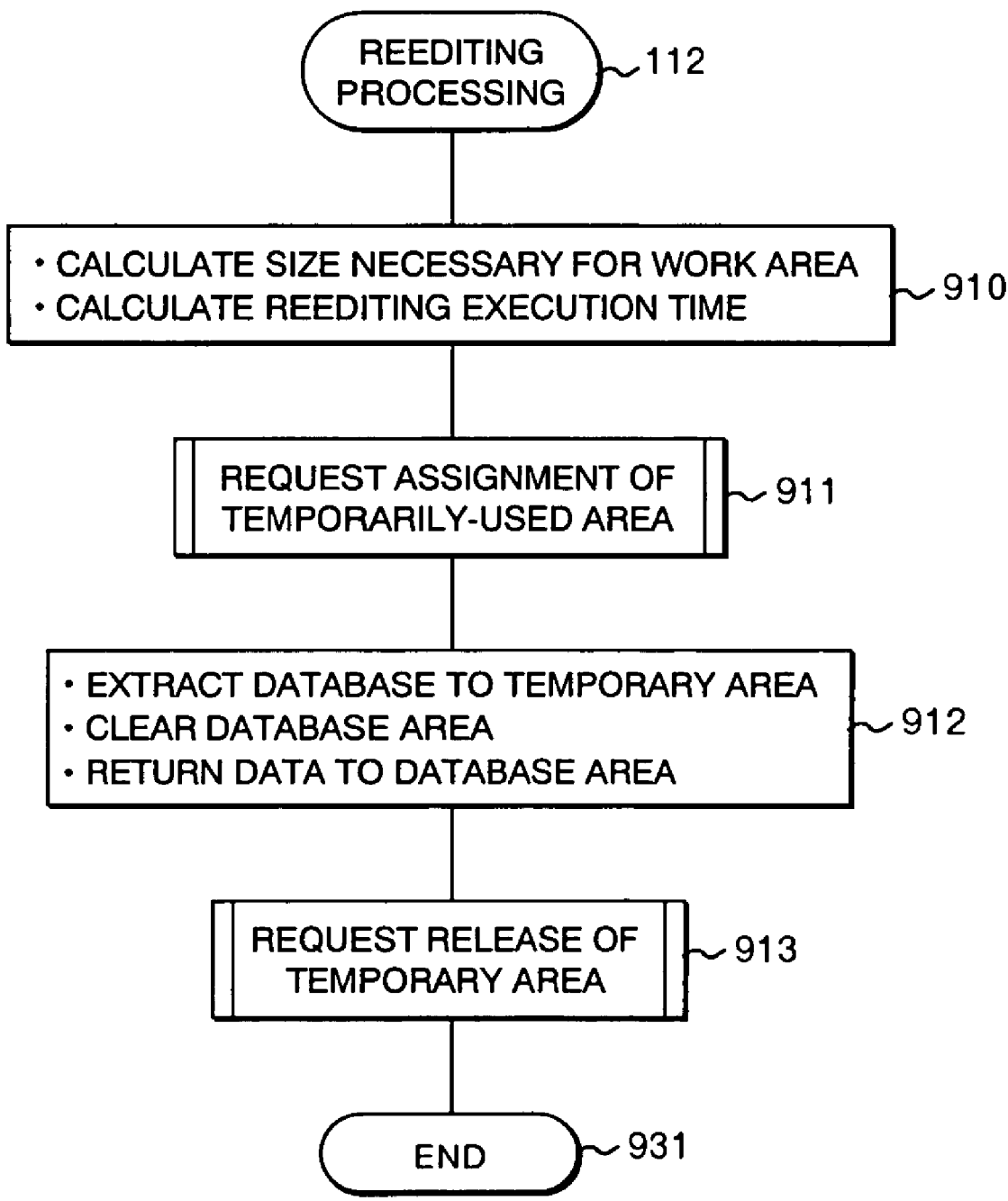
FIG. 9 is a flowchart showing the operation of reediting processing.

Next, a description is given of the reediting processing 112 of the DBMS 110 with reference to FIG. 9.

The storage manager starts the reediting processing by operating the console terminal 205' of the DBMS 110.

The reediting processing 112 is started and then the size necessary for work area is calculated and obtained based on the size of the database 118 (storage capacity) as the reediting target. Next, the executing time required by the reediting is calculated and obtained based on the size of the database 118 (in step 910). The reediting processing mainly includes the data movement to the work area 320 from a database area 310 as a designated target and the data movement to a database area 312 from the work area 320. Thus, by multiplying the number of input/output (I/O) requests for reading and writing the data to be moved and the data, the reediting execution time can be obtained.

Next, the storage management system 100 requests the assignment of the temporarily-used area by designating the necessary area size as the obtained work area size and reediting execution time (in step 911). By executing the "assign area" 101 in the storage management, the matching temporary area is assigned and the information on the temporary assignment is registered to the temporarily-assigned area list 107.

The information on the temporary assignment of the area is transmitted to the DBMS 110 from the storage management system 100. Then, the DBMS 110 sets the assigned temporary area as the work area, sequentially reads a database 310, and writes the read data to the work area 320 as the temporary area (refer to FIG. 3A). The DBMS 110 clears the area of the database 311 (refer to FIG. 3B). After that, the DBMS 110 sequentially reads the data from the work area 320 and writes the read data to the area of the database 312 (FIG. 3C), thereby returning the data (in step 912). Then, the release of the temporary area previously assured is requested (in step 913).

Figure 10:
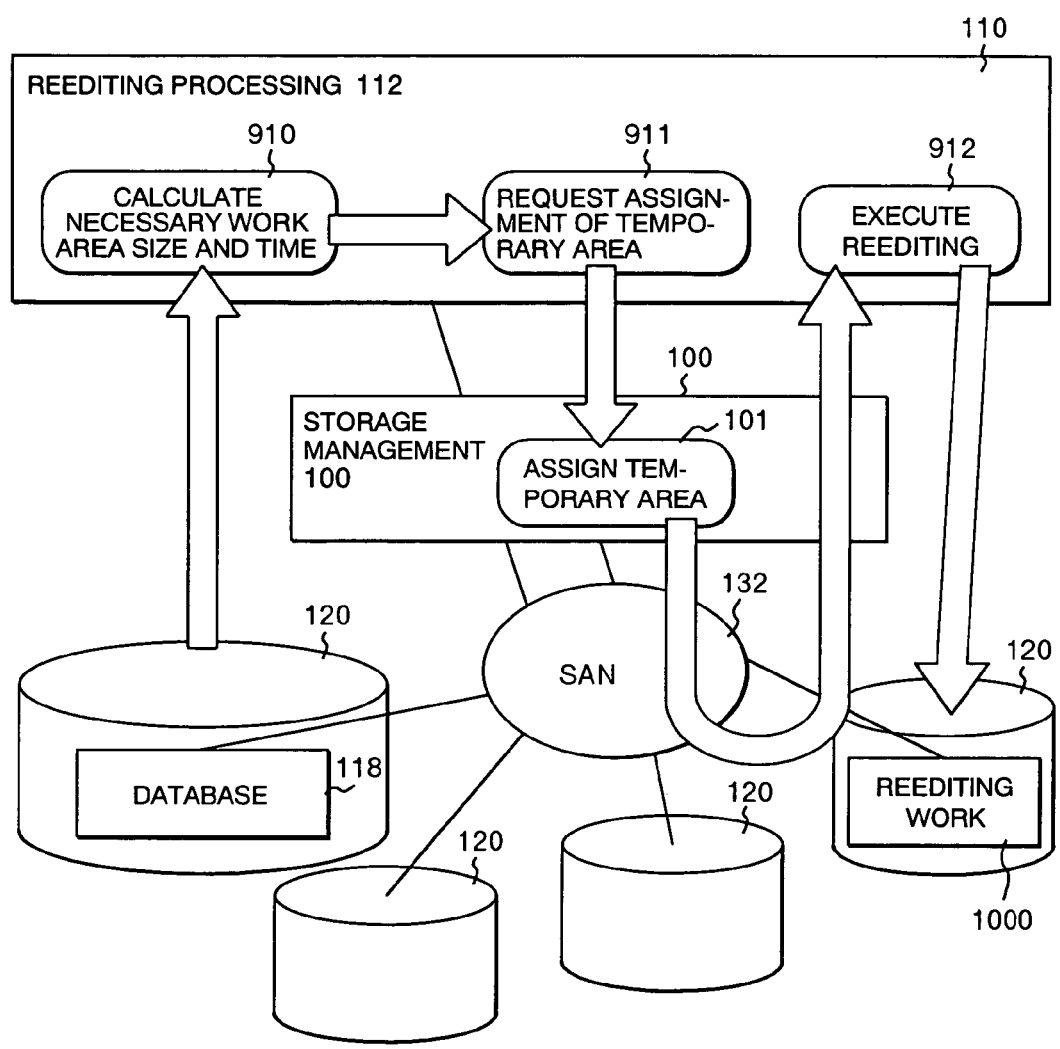
FIG. 10 is a schematic diagram of the reediting processing 112.

FIG. 10 shows a schematic diagram of the abovementioned reediting processing.

Referring to FIG. 10, in the "execute reediting processing" 112 of the DBMS 110, the necessary area size and time are obtained by referring to the database 118 as the reediting target (in step 910). The temporary area is assigned to the storage management 100 with the obtained area size for the obtained time (in step 911). The storage management 100 sends, to the assignment request source, an area 1000 which can be used in the temporary area assignment processing (in step 101). The DBMS 110 executes the reediting, sets, as a reediting work, the notified area 1000 in which the reediting is executed, and extracts and re-stores the database 118. Thus, the DBMS 110 assures the necessary work area and reedits it.

According to this embodiment, the temporary area of the storage devices 120 is used at the period for the reediting processing of the DBMS 110. However, the present invention is not limited to the reediting of the DBMS 110 and the temporary area of the storage devices 120 can be used for other processing requiring the temporary area, e.g., as another OS area, an area for inner sorting, or a work area for applications.

When a plurality of DBMSs and another application use the storage device 120 connected to the SAN, conventionally, it is necessary to prepare and previously assign the entire storages in the work area used by the application. However, according to the first embodiment, when the application needs the work area, the storage is secured and is used only for the necessary period and therefore it is possible to prepare the storage with the maximum capacity in the work area used by the application and share the work area. Thus, the necessary storage amount is reduced and the storage costs are suppressed. Further, in order to assure the work area, the user does not need to assign the storage and therefore the management costs of the user can be suppressed.

Next, the second embodiment of the present invention will be described with reference to FIG. 11.

Figure 11:
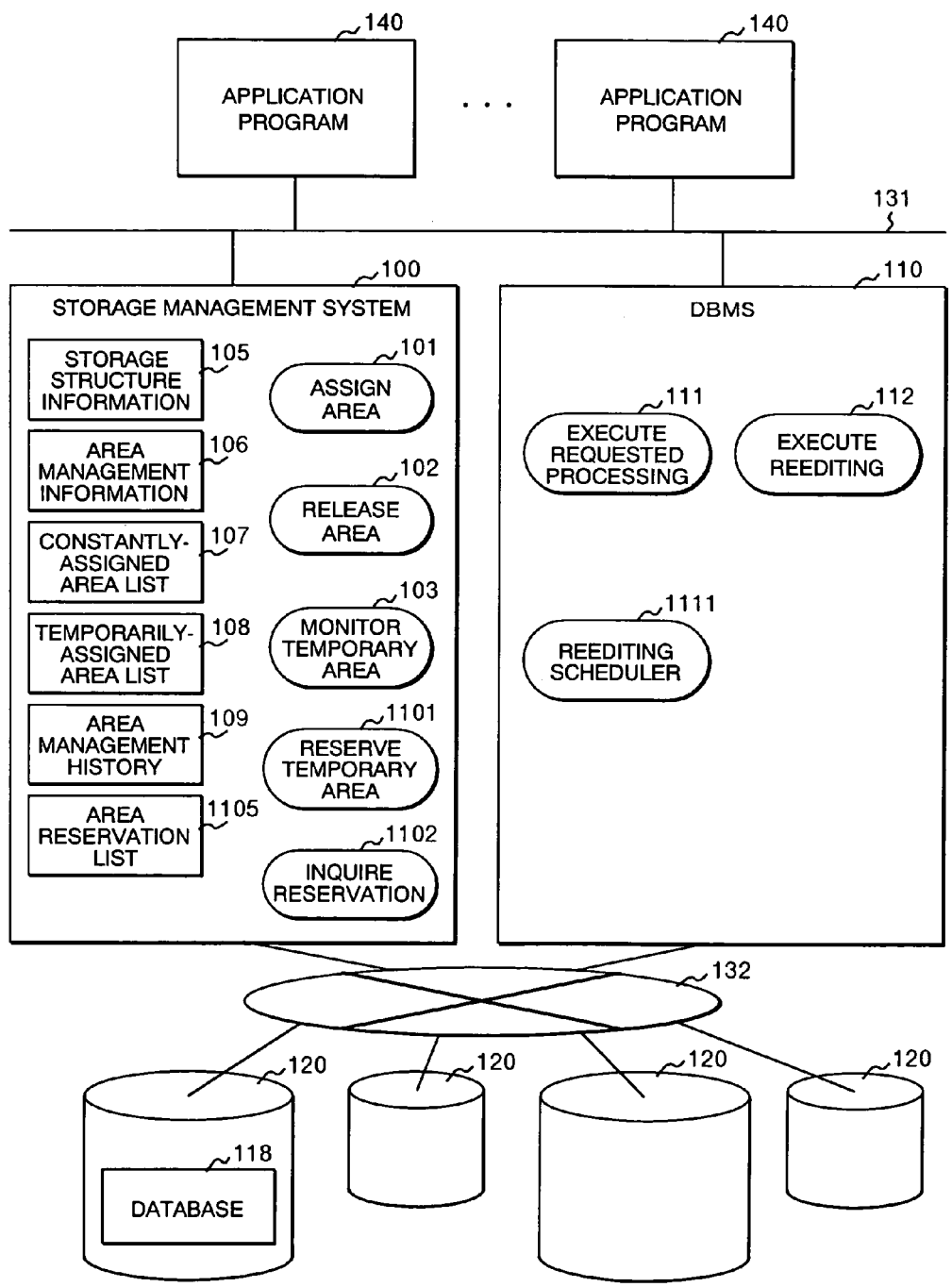
FIG. 11 is a diagram showing the entire structure of a storage system according to another embodiment of the present invention.

This example shown in FIG. 11 shows the temporary area assignment reservation processing of the storage management and the database area reediting processing of the DBMS using the temporary area assignment reservation processing of the storage management.

In a storage system shown in FIG. 11, the storage management system 100 additionally has functions of "reserve temporary area" 1101, "inquire reservation" 1102, and area reservation list 1105, as compared with the structure of the storage system 100 shown in FIG. 1, and the DBMS 110 further has a reediting scheduler 1111. The hardware structure of the storage system is the same as that shown in FIG. 2.

When the assignment reservation of the temporary area is received, the storage management system 100 executes the "reserve temporary area" 1101, and registers the reservation contents to the area reservation list 1105. When the "inquire reservation" 1102 is received, the storage management system 100 returns the reservation. In the DBMS 110, the reediting scheduler 1111 determines the execution time for the reediting and executes the reediting for the execution period.

FIG. 17 shows one example of the table structure of the area reservation list 1105.

The area reservation list 1105 registers information indicating a user name 171, a reservation date 172, a reservation size 173, a using period 174, a reserved storage device 175, and an area name 176.

Figure 12:
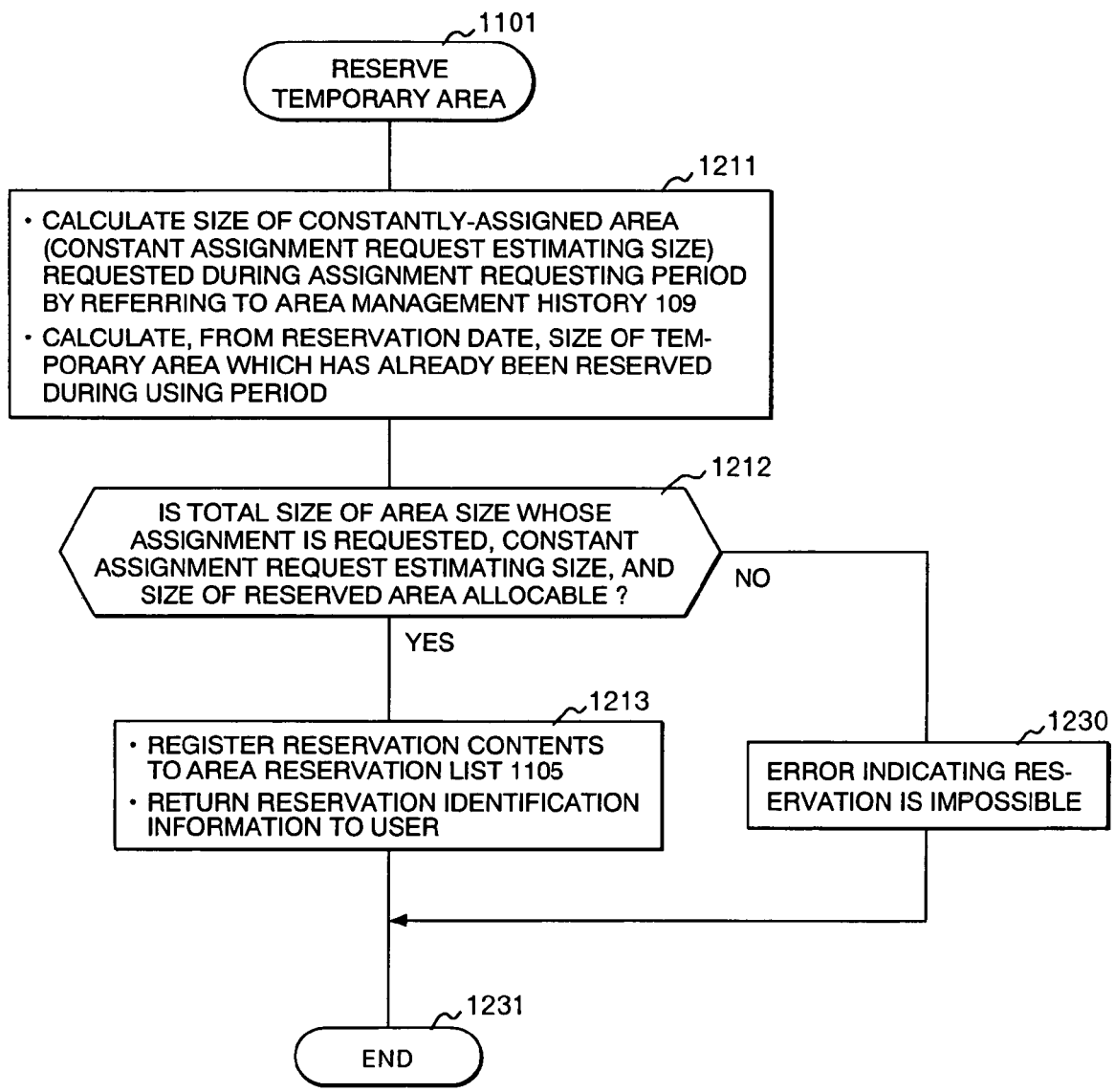
FIG. 12 is a flowchart showing the operation of temporary-reservation processing according to another embodiment.

Next, a description is given of reservation processing of the storage system shown in FIG. 11 with reference to a flowchart of FIG. 12.

First, the storage management system 100 receives the request "reserve temporary area" 1101 from the program using the storage device 120 of the DBMS 110. In the request of the "reserve the temporary area" 1101, the reservation date, necessary area size, and using period are designated.

First, in the "reserve temporary area" 1101, the constantly-assigned area size (constantly-assigned request estimated size) which is requested during the assignment requesting period is calculated by referring to the area management history 109 (in step 1211). The area assuring size which is performed at the designated assignment period is estimated based on the transition of the past area-assuring amount. Next, the temporary area size (reserved area size) which has already been reserved from the reservation date at the assignment period is obtained by referring to the area reservation list 1105, and it is checked whether or not the total size of the area size whose assignment is requested, constantly-assigned request estimated size, and reserved area size can be assigned (in step 1212).

When the total size of the areas can be assigned as the check result, the reserved contents are registered to the area reservation list 1105, and the reservation identification information is returned to the requesting source (in step 1213). If the total size of the areas cannot be assigned, a message that the reservation is impossible is sent to the requesting source (in step 1230). In this case, the reserved contents are not registered to the area reservation list 1105.

The "inquire reservation" 1102 is received and then the referring date is designated from the request source. Thus, the area reservation list 1105 is referred to, the reservation at the designated date is referred to, and the referring results are returned to the request source.

Figure 13:
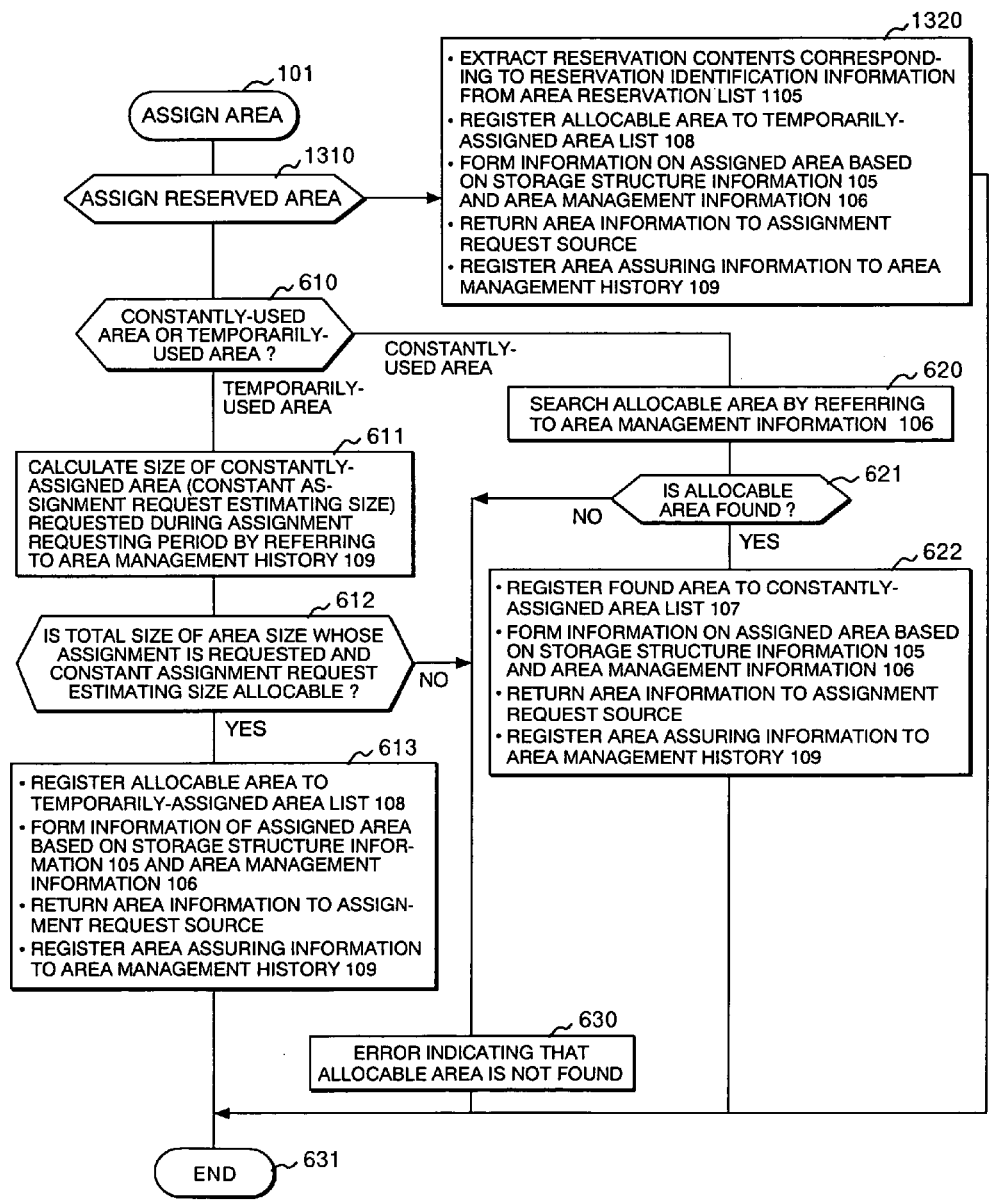
FIG. 13 is a flowchart showing the operation of area assignment processing according to another embodiment.

FIG. 13 is a flowchart showing the reserved-area assignment processing in the reservation processing.

As compared with the flowchart shown in FIG. 6, the processing operation additionally adds steps 1310 and 1320. That is, in the reserved-area assignment, the reservation identification information is designated and is requested to the "assign area" 101. When the storage management system 110 receives the request for assigning the area, it checks whether or not the request is one for assigning the reserved area (in step 1310). As the result, if it is determined that the request is the request for assigning the reserved area, the reservation contents corresponding to the reservation identification information are extracted by referring to the area reservation list 1105, and the temporary area assignment processing is executed in accordance with the extracted reserved contents (in step 1320). The subsequent processing is the same as the operation flow shown in FIG. 6 and a description thereof is omitted.

Figure 14:
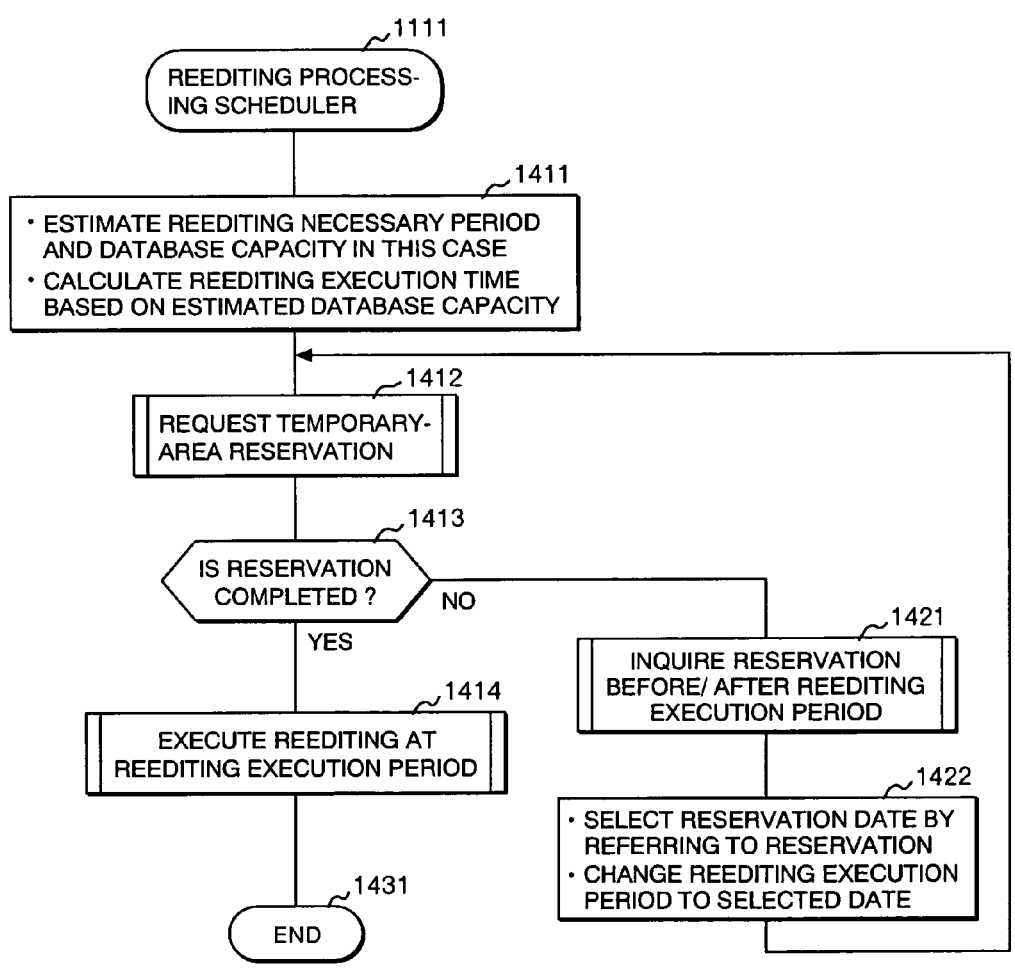
FIG. 14 is a flowchart showing the operation of a reediting processing scheduler according to another embodiment.

Next, a description is given of the reediting processing schedule processing of the DBMS 110 with reference to FIG. 14.

The reediting processing scheduler 1111 estimates the reediting execution period. The reediting processing scheduler 1111 periodically analyzes the storage state of the database and estimates the period requiring the reediting and the database capacity in this case. Next, the reediting processing scheduler 1111 obtains the reediting execution time based on the estimated database capacity (in step 1411).

Next, the calculated date requiring the reediting is set as the reservation date, the database capacity in this case is set as the necessary area size, and the reediting execution time is set as the assignment period. Then, the reediting processing scheduler 1111 reserves the temporary area to the storage management system 100 (in step 1412).

It is checked whether or not the area is reserved as the result of the processing of the "reserve temporary area" 1101 in the storage management (in step 1413). As the checking result, if the area is reserved, the reservation identification information is received and the reediting processing is executed at the reediting execution period (in step 1414).

On the other hand, if the area is not reserved, the reservation at the reediting execution period is inquired (in step 1421). In the processing of the "inquire reservation" 1102 of the storage management, the reservation is returned, the reservation date is selected by referring to the reservation, and the reediting execution period is changed into the period of the selected reservation date (in step 1422). Then, the processing subsequent to step 1412 is executed.

Figure 15:
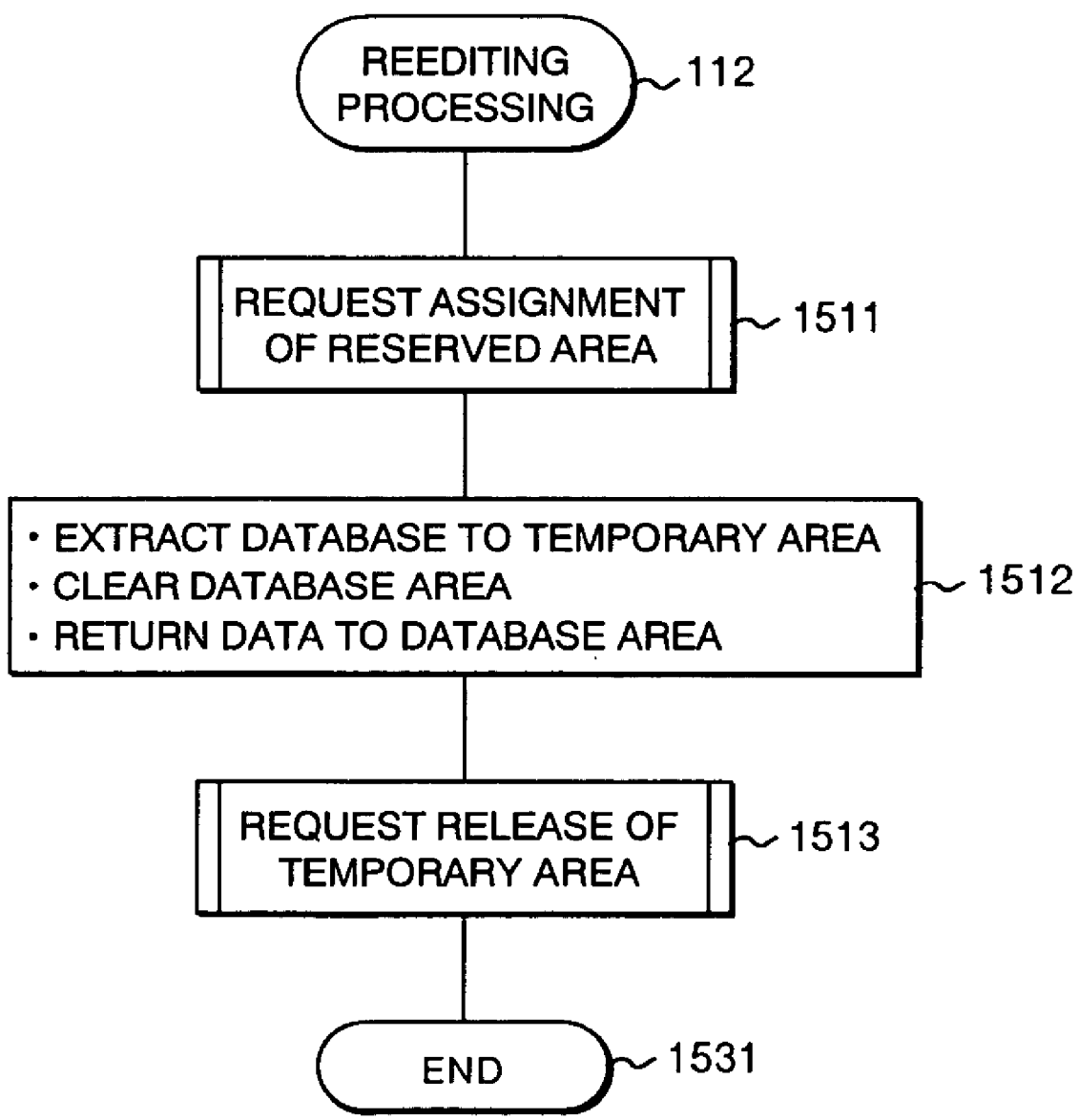
FIG. 15 is a flowchart showing the operation of reediting processing according to another embodiment.

Referring to FIG. 15, in the "execute reediting" 112 in step 1421, the assignment of the reserved area at the reediting execution period is requested (in step 1511). In the processing of the "assign the area" 101 of the storage management, the reserved temporary area is assigned and the information on the assigned area is returned. Then, the assigned temporary area is set as the work area, the database is extracted to the temporary area, the database area is cleared, and, after that, the data is returned to the database area (in step 1512). The release of the finally-assured temporary area is requested (in step 1513).

As mentioned above, according to the second embodiment, in the case of previously determining the period requiring the work area on the application, the assuring of the operation work is reserved, thereby ensuring the area at the period. When the reservation is impossible at the necessary period, the period is changed by referring to the reservation, thereby preventing the state that the area is not assured at the execution period.

According to the above embodiment, the description is given of the example in which when the area is used over the period designated upon securing the temporary area, the storage management system 100 returns the message to the console terminal 205 and sends a notification to the storage management. Similarly, the storage management forcedly releases the assignment or accounts the overcharge of overtime upon accounting the used area.

Figure 18:
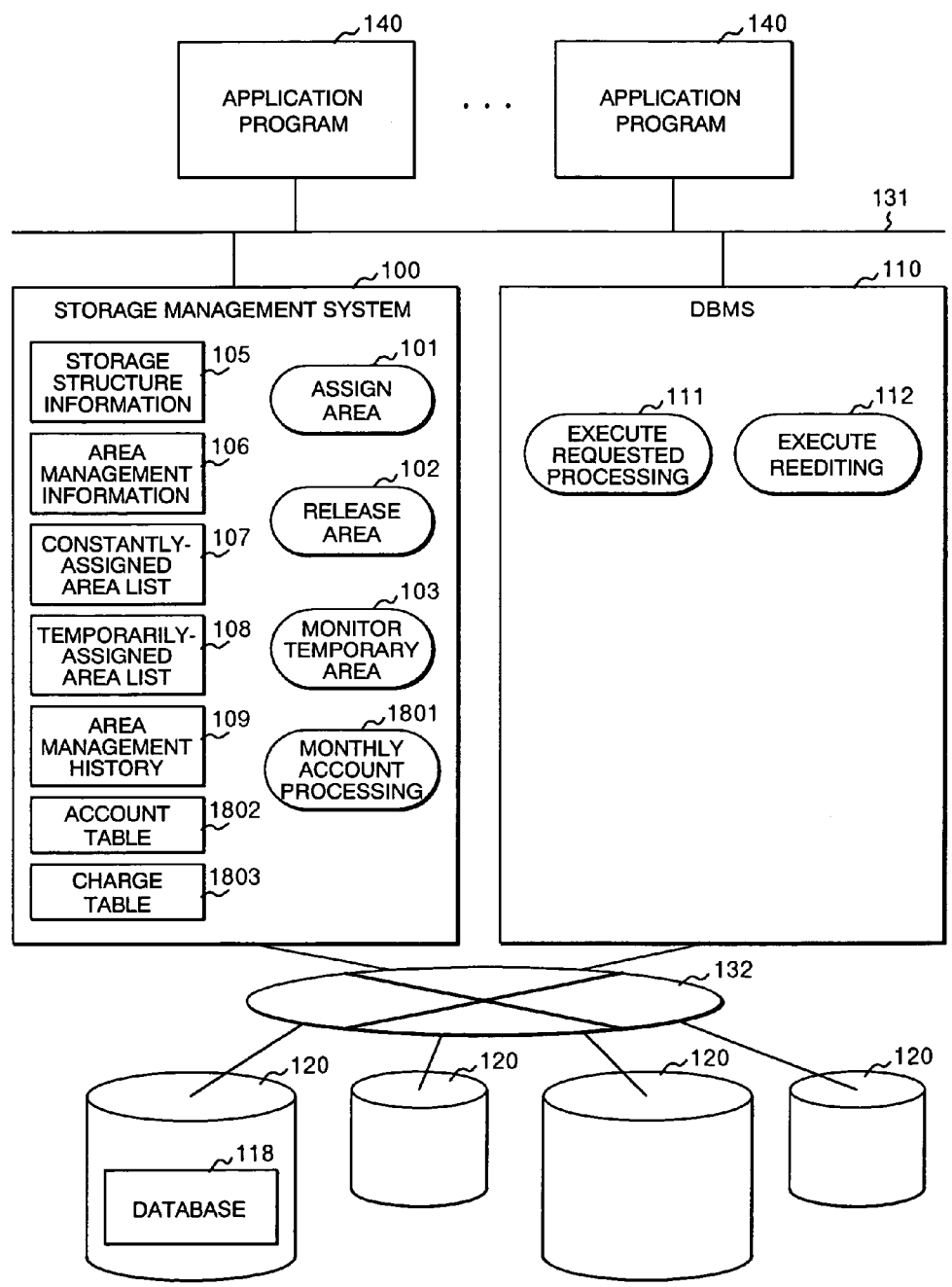
FIG. 18 is a diagram showing the entire structure of a storage system according to yet another embodiment of the present invention.

Next, a description is given of account processing upon securing the temporary area with reference to FIG. 18.

In the example shown in FIG. 18, upon accounting the used area, when the area is used over the period designated upon assuring the temporary area, the storage management system 100 performs the processing for accounting the excess in accordance with the overtime of the first designated period.

Referring to FIG. 18, in a storage system, the storage management system 100 has functions of monthly account processing 1801, an account table 1802, and a charge table 1803 in addition to the functions of the storage management system 100 shown in FIG. 1. Incidentally, the hardware structure is the same as that shown in FIG. 2.

Referring to FIG. 19, the account table 1802 registers information indicating a user name 1901, a storage device 1902, an assignment size 1903, use time 1904, and an account rank 1905.

Referring to FIG. 20, the charge table 1803 registers information indicating a storage device 2001, constant assignment 2002, and temporary assignment 2003. The constant assignment 2002 registers the monthly charge and daily charge. The temporary assignment 2003 registers information indicating monthly charge, daily charge, and excess.

The storage manager operates the console terminal 205' to execute the monthly account processing 1801 at the end of each month. In the monthly account processing 1801, the used amount of the storage is summed and the result is stored in the charge table 1802.

Figure 21A:
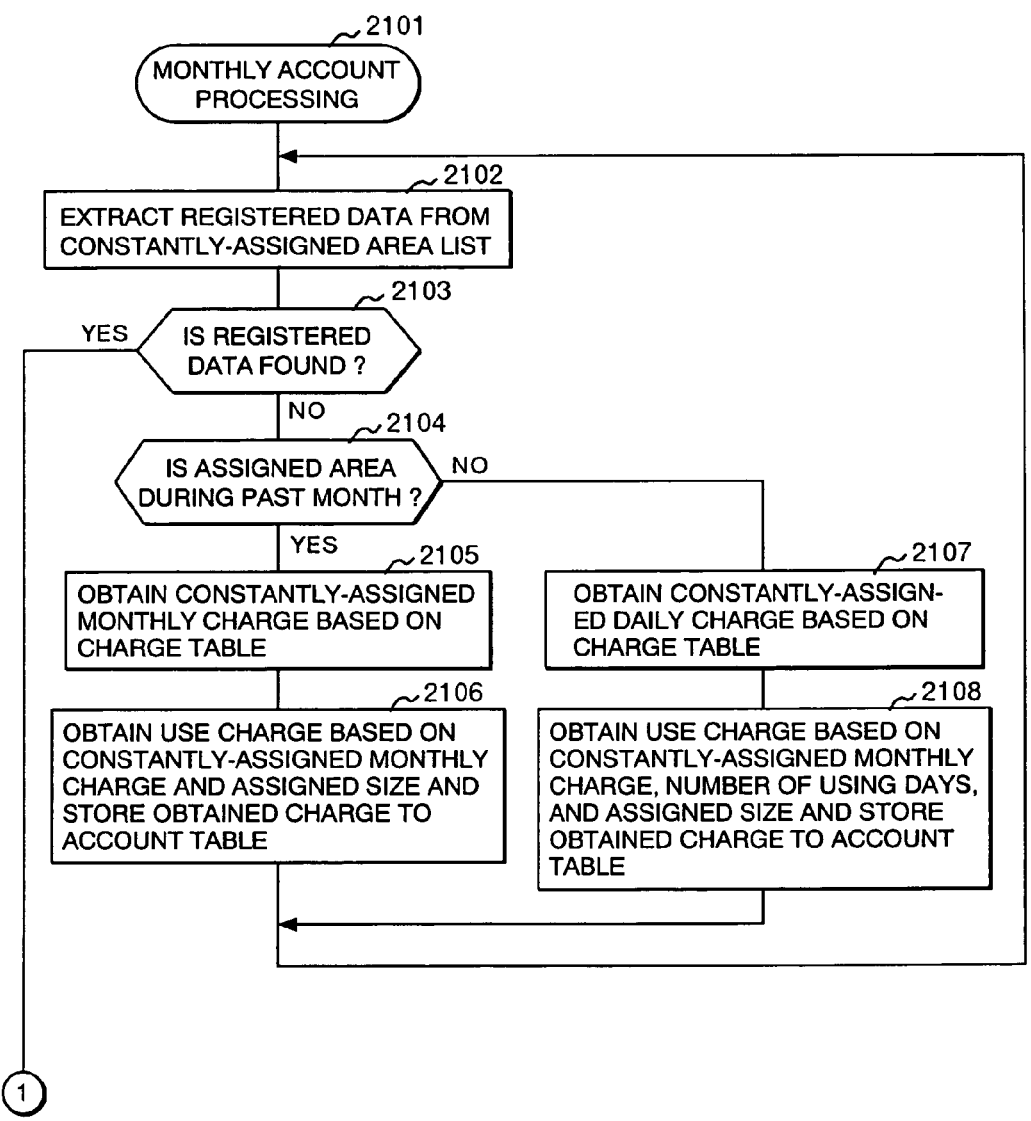
FIG. 21A is a flowchart showing one example of the account processing operation according to another embodiment.
Figure 21B:
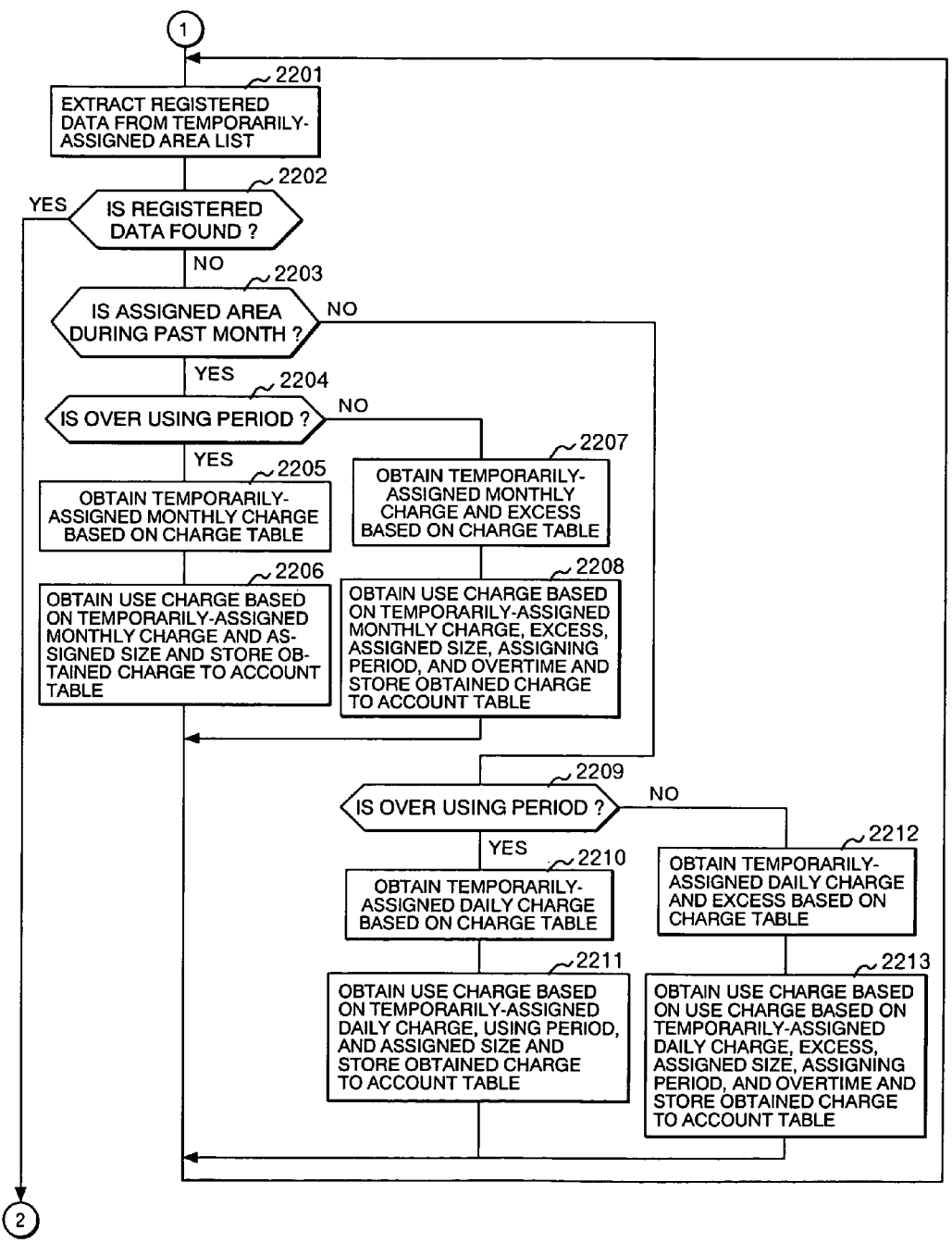
FIG. 21B is a flowchart showing another example of the account processing operation according to another embodiment.
Figure 21C:
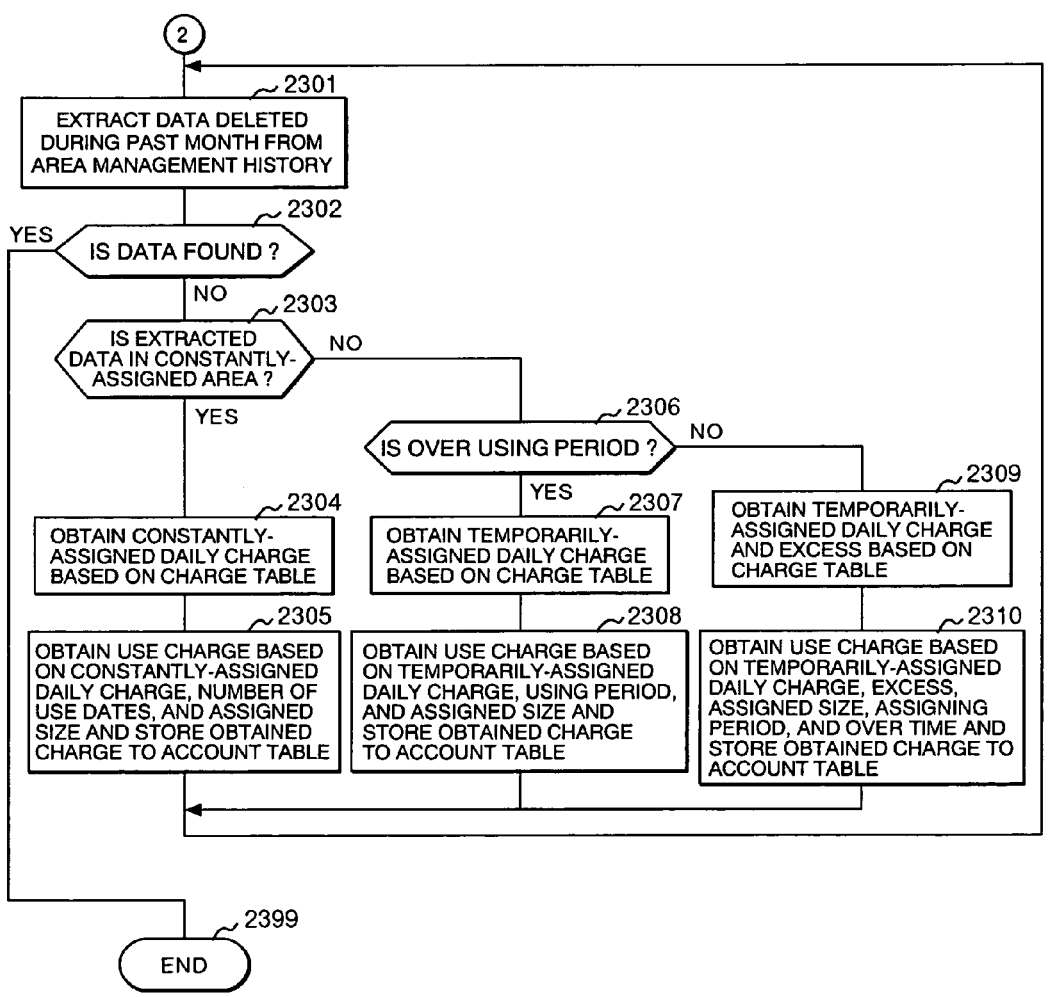
FIG. 21C is a flowchart showing another example of the account processing operation according to another embodiment.

The account processing will be described with reference to FIGS. 21A to 21C.

The registered data is extracted from the constantly-assigned area list 107 (in step 2102), and it is determined based on the assignment date 405 whether or not the data is the area assigned during the past month from the assignment date 405 (in step 2104). If it is determined that the data is not the area assigned more than one months ago (in steps 2104 and 2105), the constantly-assigned monthly charge is obtained corresponding to the storage device name 402 of the extracted data (in step 2105). The constantly-assigned monthly charge is obtained based on the unit time of the storage device and the constantly-assigned area monthly charge per capacity registered in the charge table 1803, corresponding to the storage device name 402 in the constant area assigned area list 107.

The use charge is obtained based on the constantly-assigned monthly charge and the assigned size 404, and the obtained use charge, the user name, and the storage device name are stored to the account table 1802 (in step 2106).

If it is determined that the data is the area within one month (in steps 2104 to 2107), the constantly-assigned daily charge is obtained corresponding to the storage device name 402 of the extracted data (in step 2107). The constantly-assigned daily charge is obtained based on the charge table 1803.

The use charge is obtained based on the obtained constantly-assigned daily charge and the number of use days and the assigned size 404, and the obtained use charge, the user name, and the storage device name are stored into the account table 1802 (in step 2108). After that, the operation is repeated until the registered data in the constantly-assigned area list 107 is not found (in steps 2102 to 2106, 2102 to 2108, and 2103 to 2210).

Next, the registered data is extracted from the temporarily-assigned area list 108 (in step 2201), it is determined based on the assignment date 405 whether or not the data is the area assigned within one month (in step 2203). If it is determined that the data is not the area assigned more than one month ago (in steps 2203 and 2204), it is checked based on the assignment date 505, using period 506, and the current date, whether or not the data is over the user time (in step 2204).

As a check result, if it is determined that the data is not over the using period (in steps 2204 and 2205), the temporarily-assigned monthly charge is obtained corresponding to the storage device name 502 of the extracted data. The temporarily-assigned monthly charge is obtained based on the charge table 1803 (in step 2205). The use charge is obtained based on the calculated temporarily-assigned monthly charge and the assigned size 504 and the obtained use charge, the user name, and the storage device name are stored into the account table 1802 (in step 2206).

As the result of checking the using period (in step 2204), if the data is over the using period (in steps 2204 to 2207), the using period before the overtime and the overtime are obtained and the excess is obtained based on the charge in the charge table 1803 (in step 2207), and the obtained excess is stored in the account table 1802 (in step 2208).

As the result of checking the assigned area within one month (in step 2203), it is determined that the data is the area assigned during the past month (in steps 2203 to 2209), it is checked based on the assignment date 505, the using period 506, and the current date, whether or not the data is over the using period (in step 2209). Consequently, if it is determined that data is not over the using period (in steps 2209 and 2210), the temporarily-assigned daily charge is obtained corresponding to the storage device name 502 of the extracted data (in step 2210). The use charge is obtained from the obtained temporarily-assigned daily charge, the using period 505, and the assigned size 504, and the obtained using charge, the user name, and the storage device name are stored in the account table 1802 (in step 2211).

As the checking result (in step 2209), if the data is over the using period (in steps 2209 to 2212), the temporarily-assigned daily charge and the excess are obtained based on the charge in the charge table 1803 (in step 2212), and the obtained use charge is stored in the account table 1802 (in step 2213).

The operation is repeated until the registered data in the constantly-assigned area list 107 is not found (repetition in steps 2201 to 2206, 2208, 2211, and 2213 and steps 2202 to 2301).

Next, the data deleted during the past month is extracted by referring to the area management history 109 (in step 2301). It is checked whether the extracted data is in constantly-assigned area or the history of the constantly-assigned area (in step 2303). If it is determined that the data is in the constantly-assigned area (in steps 2303 and 2304), the constantly-assigned daily charge is obtained corresponding to the storage device name 402 (in step 2304). The use charge is obtained based on the calculated constantly-assigned daily charge, the using period, and the assigned size and the obtained using charge, the user name, and the storage device name are stored in the account table 1802 (in step 2305).

If the extracted data is in the temporarily-assigned area (in steps 2303 to 2306), it is checked based on the assignment date, the using period, and the deleted date whether the data is over the using period (in step 2306). If it is determined that the data is not over the using period (in steps 2306 and 2307), the temporarily-assigned daily charge is obtained corresponding to the storage device name of the extracted data (in step 2307). The use charge is obtained based on the calculated temporarily-assigned daily charge, the using period, and the assigned size and the obtained use charge, the user name, and the storage device name are stored in the account table 1802 (in step 2308).

As a checking result (in step 2306), if the data is over the using period (in steps 2306 to 2308), the temporarily-assigned daily charge and the excess are obtained based on the charge table 1803 (in step 2308). The use charge is obtained based on the using period before the overtime, the overtime, and the charge in the charge table 1803 and is stored in the account table 1802 (in step 2309).

The operation is repeated until there is no data deleted during the past month (repetition in steps 2302 to 2305, 2308, and 2309 and steps 2302 and 2399). Through the above processing, the monthly account processing ends.

The embodiments of the present invention are described and the present invention can variously be modified.

For example, the storage management system 100 and the processing device which functions by executing the DBMS 110 may not be necessarily individual processing devices but one processing device.

According to the present invention, the storage management system receives the request for assigning the temporary area with the area size at the using period. Further, the transition estimation of the area assignment is obtained based on the history information on the storage device, it is determined whether or not the non-assigned area can be used within the requested period, then, if it can be used, and the non-assigned area is assigned as the temporary area, and it can effectively be used.

Further, if the area is necessary for work such as the reediting processing of the DBMS, the temporary area can be assigned. Without preparing the work area, the storage with the necessary capacity can be secured and be used if necessary.

What is claimed is:

1. An area assigning method in a storage management system for managing a storage device for storing data, comprising the steps of:
    holding management information for managing the storage device, area assignment information for managing an area assigning state of the storage device, and history information for managing a history of area assuring and release;
    pursuant to an assignment request for temporarily using an area of the storage device in association with designation of an area size and a using period, calculating the size of a constantly-assigned area of the storage device previously requested, by referring to the history information;
    determining, based on the calculated size of the constantly-assigned area and on the designated area size, whether or not there is sufficient storage device capacity for the constantly-assigned area and for the area of the storage device requested for temporary use, for the using period which is requested for assignment; and
    assigning the area size designated by the request, the using period, and the area of the storage device having the area size, when the area of the storage device can be assigned as a result of the determination.

2. The area assigning method according to claim 1, further comprising the steps of:
    obtaining a necessary area size and a necessary using period upon executing processing for temporarily using the storage;
    requesting assignment of the area which is temporarily used for storage management; and executing processing by using the area assigned for the storage management and requesting release of the assigned area after completing the processing.

3. The area assigning method according to claim 1, further comprising the steps of:
   obtaining an execution time of reediting processing and a size of a work area necessary for reediting when a database management system executes the reediting processing;
   requesting the assignment of the area which is temporarily used for the storage management; and
   executing the reediting, as a work area, the area assigned for the storage management and requesting release of the work area when the reediting completes.

4. The area assigning method according to claim 1, wherein in the step of calculating the size of the constantly-assigned area, when the storage management system receives a request for an assignment reservation for temporarily using the area in association with the designation of a using time, the area size, and the using period, the size of the constantly-assigned area is calculated based on an area reservation state and the history information,
   in the determining step, it is determined whether or not a designated area can be assigned at a designated period from a designated time in accordance with the calculated size of the constantly-assigned area, and
   in the area assigning step, when a request is received for assigning a reserved area at a requested time, the designated period and the reserved area are assigned for the request source.

5. The area assigning method according to claim 4, further comprising the steps of:
   obtaining an execution date, a necessary area size, and a necessary period upon planning the execution of processing which temporarily uses the storage;
   requesting the assignment reservation of the area which is temporarily used for the storage management;
   requesting the assignment of the reserved area for the storage management at the execution date; and
   executing the processing by using the area assigned for the storage management and requesting the release of the area which is not necessary after completing the processing.

6. The area assigning method according to claim 4, further comprising the steps of:
   scheduling execution of reediting processing and obtaining a scheduled date, a size of a work area necessary for the reediting processing, and execution time of the reediting processing;
   requesting the assignment reservation of the area which is temporarily used for the storage management;
   requesting the assignment or the reserved area on the scheduled date of executing the reediting; and
   executing the reediting of the assigned area for the storage management as the work area and requesting the release of the assigned area upon completing the reediting,
   wherein the reediting processing is executed by a database management system.

7. The area assigning method according to claim 4, wherein the storage management system returns reservation information and area assignment information to a request source upon receiving the request for inquiring the reservation state.

8. The area assigning method according to claim 5, further comprising the steps of:
   requesting the assignment reservation of the area which is temporarily used for the storage management and obtaining a reservation date based on the reservation state when the area is not reserved on the requested date and then an inquiry of the reservation state is requested; and
   setting the obtained date as the requested date and requesting the assignment reservation of the area which is temporarily used for the storage management.

9. The area assigning method according to claim 6, further comprising the steps of:
   requesting the assignment reservation of the work area necessary for editing, and when the area is not reserved on the reediting scheduled date, requesting an inquiry of the reservation state by a database management system;
   obtaining the reservation date based on the reservation state and then changing a reediting execution scheduled date to the obtained date; and
   requesting the assignment reservation of the work area necessary for reediting on the changed reediting execution scheduled date.

10. An area management method in a storage management system for managing a storage device for storing data, comprising the steps of:
    holding management information for managing the storage device, area assignment information for managing an area assignment state of the storage device, and history information for managing a history on area assuring and release;
    receiving an assignment request for temporarily using an area of the storage device in association with designation of an area size and a using period for the requested area;
    determining whether or not an area having the requested area size can be assigned for the requested using period by referring to information calculated from the held history information;
    assigning an area having the requested size for the requested using period to a request source if the area can be assigned as a result of the determination;
    calculating the size of a constantly-assigned area of the storage device previously requested, based on the history information referenced in the determining step; and
    determining whether or not the requested area can be assigned for the requested using period based on the calculated size.

11. A computer readable medium encoded with a computer program having a function for executing the method according to claim 1.

12. A storage management system for managing a storage device for storing data in response to a request from an application, the storage management system comprising:
    a main memory for holding management information for managing the storage device, area assignment information for managing an area assignment state of the storage device, and history information for managing a history of area assuring and release; and
    processing means for assigning an area of the storage device to the application in accordance with the management information and the area assignment information, the processing means comprising:

calculating means for calculating, pursuant to an assignment request for temporarily using an area of the storage device in association with designation of an area size and a using period, calculating the size of a constantly-assigned area of the storage device previously requested, by referring to the history information;

means for determining, based on the calculated size of the constantly-assigned area and on the designated area size, whether or not there is sufficient storage device capacity for the constantly-assigned area and for the area of the storage device requested for temporary use, for the using period which is requested for the assignment; and assigning means for assigning the area size and the using period designated by the request, and an area of the storage device having the area size, when the area of the storage device can be assigned as a result of the determination.

13. The storage management system according to claim 12, wherein the main memory further holds a table of a temporarily-assigned area list which stores a user name to which the area is assigned, an area name, an assignment size, and a using period.

14. The storage management system according to claim 13, wherein the processing means further comprises means for monitoring whether or not the assigned using period has expired, by referring to the table of the temporarily-assigned area list, and returns a result of the monitoring by the monitoring means to a console terminal.

15. The storage management system according to claim 14, wherein the main memory further stores an account table for managing a user name and a using period of the storage device, and a charge table for registering at least an excess of use of an area by temporary assignment on the storage device, and wherein the processing means further comprises calculating means for calculating an excess of an area use charge by referring to the account table and the charge table.

* * * * *